April 29, 1947. D. D. ORMSBY 2,419,912
AUXILIARY POWERED VEHICLE CONSTRUCTION
Filed Aug. 26, 1940 3 Sheets-Sheet 1

INVENTOR
Donald D. Ormsby
BY Walter E. Schirmer
ATTORNEY.

April 29, 1947. D. D. ORMSBY 2,419,912
AUXILIARY POWERED VEHICLE CONSTRUCTION
Filed Aug. 26, 1940 3 Sheets-Sheet 3
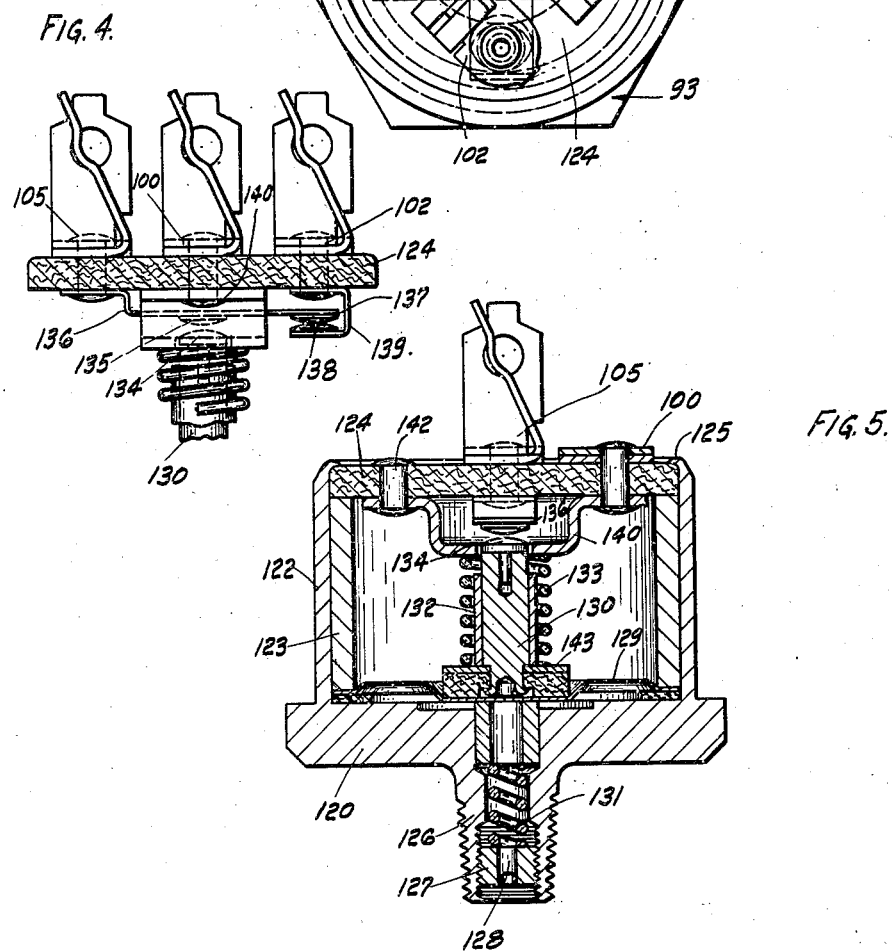
INVENTOR
Donald D. Ormsby
BY Walter E. Schirmer
ATTORNEY.

Patented Apr. 29, 1947

2,419,912

UNITED STATES PATENT OFFICE 2,419,912

AUXILIARY POWERED VEHICLE CONSTRUCTION

Donald D. Ormsby, Buchanan, Mich., assignor to Clark Equipment Company, Buchanan, Mich., a corporation of Michigan Application August 26, 1940, Serial No. 354,322

16 Claims. (Cl. 180—54)

This invention relates to control systems, and more particularly is concerned with a control system for a booster engine vehicle of the type described in the copending application of Donald D. Ormsby, Serial No. 256,947, filed February 17, 1939, in which a truck or similar commercial vehicle is provided with an auxiliary engine arranged and connected into the transmission of the vehicle by means of an overrunning clutch or the like and a set of gears connected to the transmission countershaft. The auxiliary engine is arranged to be normally inoperative when the main engine is not over-loaded, but when speed and load conditions at the main engine indicate the need for additional torque the auxiliary engine is started, brought up to speed and connected into the power train to add its torque to the drive for assisting the main engine.

Preferably, the control system is so arranged that the booster or auxiliary engine cannot be started below a predetermined minimum speed such as the low speed or creeper gear speed of the vehicle in order to prevent the application of too much torque to the driving axle, which might tend to over-stress the same. However, the auxiliary engine is desirable for use in speeds above the creeper gear speed when pulling away from a traffic signal or acceleration, and the control system is so designed that above minimum speeds, such as six or seven miles an hour, the booster engine will automatically be cut in and add its torque to the main engine whenever the main engine is under full load.

It is also desirable that the booster engine be rendered inoperative when the vehicle is travelling at a speed above that desired for safe transportation, and for these reasons the control system is adapted to cut the booster engine out at speeds above 40 to 45 M. P. H. so that the booster engine cannot be used for speeding on the highways.

Another very desirable feature of such a vehicle construction is to have the booster engine cut in as the vehicle begins to decelerate when going up hill due to the grade and load conditions. The control system is therefore arranged so that as the speed of the vehicle drops to a point approximately between 30 to 35 M. P. H., depending upon individual requirements, the booster engine is started and coupled to the drive train whenever there is an indication of a full load in the main engine.

The primary factors, therefore, which control the operation of the present control system are the load conditions at the main engine and the speed of the vehicle. The load conditions are sensed by means responsive to manifold pressure, while the speed conditions are controlled by a governor driven from the speedometer gearing and operating sets of relays which in turn control the various circuits for the booster engine.

One of the primary objects of the present invention is to simplify the control system disclosed in the copending application, referred to hereinbefore, and to render the system more foolproof as well as reducing the cost and the labor necessary in manufacturing and installing the same. In connection with this simplification, I have found that the generator at the booster engine can be eliminated and that manifold pressure of the booster as it is started can be employed to control the operation of the throttle control means which brings the booster engine up to full speed. In addition, I have found that by the use of a novel type of oil switch responsive to the pressure of oil in the booster engine crankcase, the starting circuit can be controlled so that it will be cut out at the proper time when the booster engine starts.

A further simplification possible with the present construction is the elimination of the vacuum line and vacuum control heretofore employed in connection with the fuel pump on the main engine for controlling the flow of fuel to the booster engine.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 3 is a top plan view of the oil switch control unit;

Figure 4 is a detail view of a portion of the unit shown in Figure 3; and

Figure 5 is a sectional view taken on line 5—5 of Figure 3.

Figure 1:
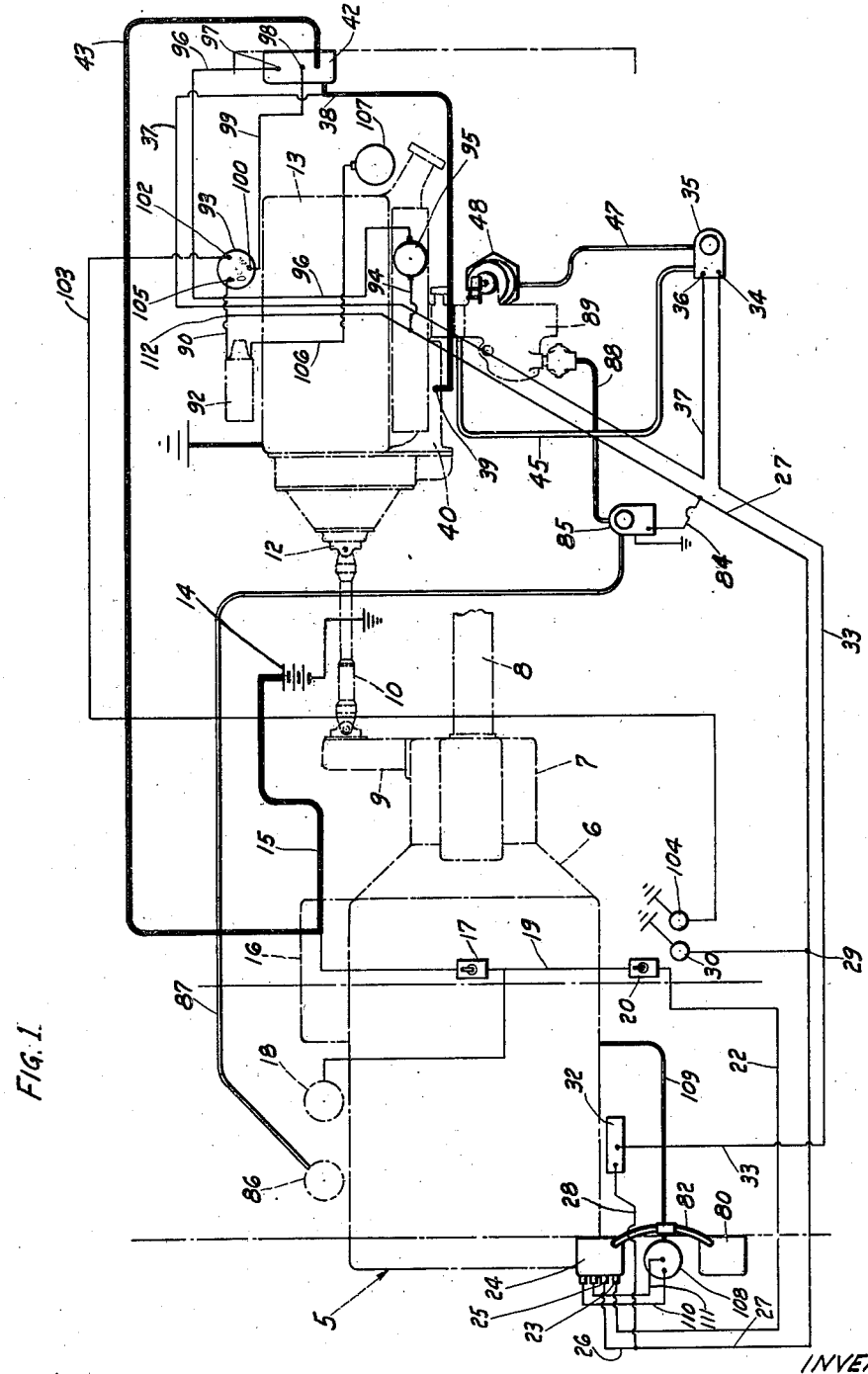
Figure 1 is a schematic diagram showing the various connections and relationship of parts for the control system.

Considering now in detail the general layout shown in Figure 1, the main engine is indicated generally by the reference numeral 5, and is provided adjacent its rear end with the conventional bell housing 6 to which is secured the transmission 7 from which transmission extends the propeller shaft 8 leading from the rear axle for driving the vehicle. The transmission 7 is provided with a power input opening over which is secured the gear case 9 containing gears which are in constant meshing engagement with the countershaft of the transmission. Leading out from the gear case 9 is a lay shaft 10, preferably of telescoping design, which parallels the propeller shaft 8 and interconnects the power input 9 with the clutch 12 of the booster engine 13. The clutch 12 is of the overrunning type, it being understood that whenever the main engine 5 is operating, the shaft 10 will be rotated thereby, and consequently no power can be transmitted from the booster engine 13 to the transmission until the booster engine reaches a speed above the speed of rotation of the shaft 10, at which time the overrunning clutch operates to positively clutch the crankshaft of the booster engine to the lay shaft 10, thereby introducing the torque of the booster engine into the main engine transmission.

The vehicle is provided with a battery 14 which may be of any standard type, and which has the power output terminal thereof connected through the conductor 15 to the starter 16, and thence through the ignition switch 17 to the high tension coil 18 which, in turn, is connected to the conventional type of distributor. A conductor 19 leading from the output side of the ignition switch 17 is adapted to extend a circuit through the booster switch 20, and thence through the conductor 22 to one terminal 23 of the relay 24.

This relay is disclosed in detail in the copending application referred to above, and consequently it is not believed that any detailed description thereof is necessary insofar as the present invention is concerned.

Form the terminal 25 of the relay 24 a circuit is extended to conductor 26, this conductor branching to provide the conductor 27 and the conductor 28. Conductor 27 leads to the booster engine, but is provided with a branch at 29 leading to a tell-tale light 30. The branch conductor 28 leads from the conductor 26 through a switch 32 controlled by the accelerator of the main engine, and thence through the conductor 33 to one terminal 34 of a vacuum solenoid valve 35 located adjacent the booster engine. The opposite terminal of the vacuum solenoid valve, indicated at 36, is connected through conductor 37 to a power conductor 38, which in turn is connected as indicated at 39 to the booster engine starting motor 40 and also to ground within the Startix. The power conductor 38 is also connected into the Startix or starting coil 42, which starting coil receives its power through the power cable or conductor 43 leading from the power conductor 15 of the battery 14.

The accelerator switch 32 is designed so that the accelerator must be pressed into full open position, or approximately full open position before the switch will be closed. Closing of the accelerator switch 32 will control the flow of current from the conductor 26 to the conductor 33, and consequently to the vacuum solenoid valve 35. Actuation of this valve opens the manifold pressure line 45 connected into the manifold by the bleeder member 46, as shown clearly in Figure 2, for communication into the line 47 leading to the diaphragm controlling the throttle actuating device indicated generally at 48.

Figure 2:
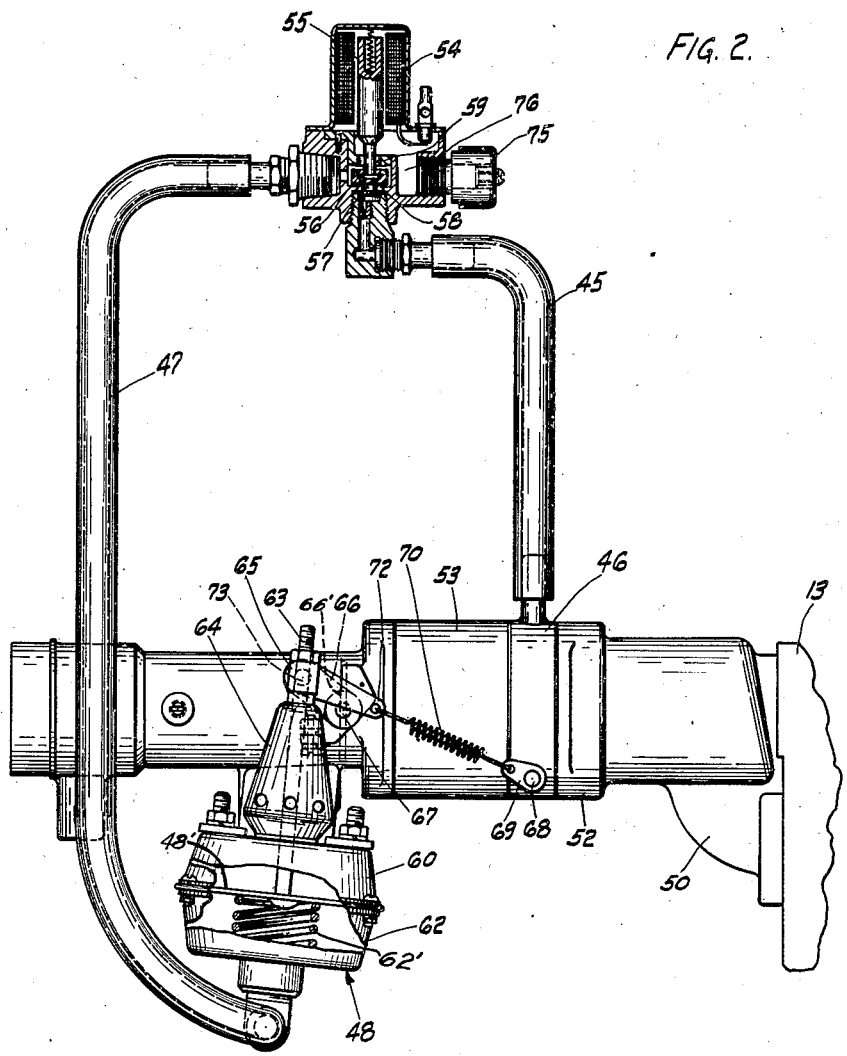
Figure 2 is an elevational view partly in section showing details of the throttle control mechanism for the booster engine and the vacuum operated control therefor.

Referring now in detail to this phase of the control system, the booster engine manifold is indicated generally at 50 in Figure 2, and is adapted to have the manifold riser or inlet flange 52 to which is normally connected the riser or outlet 53 of the carburetor. However, interposed between these members is the thin sandwich member 46 which provides means for sensing the pressure in the manifold 50 and communicating this pressure through the line 45 to the valve. The valve in turn is of the type having a solenoid 54 mounted on the top thereof with an opening therein for receiving the magnetic core or armature 55. The lower end of this armature is provided with the valve stem 56 carrying the valve 57, whereby upon energization of the coil 54, the core 55 is raised, lifting the valve member 57 from the valve seat 58 and up against the upper valve seat 59. As a result, the negative pressure in the manifold 50 results in suction being applied through the manifold line 45 and through the valve to the throttle actuating device through the line 47.

This throttle actuating device includes two body members 60 and 62 between which is clamped a flexible diaphragm 48' having mounted on one side thereof the actuating stem 63. The opposite side of the diaphragm is subjected to the suction produced in the manifold 50 whenever the valve 57 is opened, and causes flexing of the diaphragm downwardly, which in turn results in pulling the stem 63 downwardly. A suitable rubber sleeve or sealing member 64 is applied over the stem 63, and the stem itself is provided with a suitable nut or clevis 65 to which is connected the arm 66 of a butterfly valve 66' located within the carburetor outlet for controlling the flow of fuel to the manifold. Consequently, when the stem 63 is moved downwardly, the butterfly valve 66' mounted upon the pivot 67 of the arm 66 is rotated toward open position. In order to maintain the booster engine at full throttle position during its operation, an over-center spring arrangement is provided, including the pivot pin 68 mounted on the member 46 to which is connected the spring holder 69 receiving one end of a coil spring 70. The opposite end of this spring is connected to a link 72 carried by the nut 65. As a result, when the stem 63 is moved downwardly into a position where the pivot 73 for the clevis nut 65 passes over center with respect to the pivot 67 to a position therebelow, the spring is stretched while passing over center and will in its lowered position maintain a tension on the stem tending to hold it in position to maintain the booster engine throttle in full open position. It is only when no vacuum exists in the manifold 50, which would be the case when the booster engine is de-energized, that the flexing of the diaphragm 48' is sufficient to move the assembly back over center into the position shown in Figure 2. This is assisted by means of a small spring 62' placed under the diaphragm 48' in the member 48 which, when the vacuum is released, moves the diaphragm 48' upwardly with sufficient force to overcome the spring 70 and move the stem 63 upwardly into the position shown in Figure 2.

In order to relieve the vacuum pressure in the line 47 when the solenoid is de-energized, a suitable air inlet indicated at 75 is provided which may have incorporated therein suitable filtering means. When the solenoid valve is closed against the seat 58, a passage is open to atmosphere through the valve seat 59 and the chamber 76 communicating with the inlet member 75, and consequently atmospheric pressure is introduced into the line 47 to restore the diaphragm to a position in which the throttle of the booster engine is substantially closed.

Considering now in more detail the control circuits, the governor 80 which is driven from the speedometer gearing has a series of contacts therein which are selectively closed as the vehicle speed increases. These contacts are connected through suitable conductors enclosed within the cable 82 to corresponding contacts for the relay coils embodied in relay 24, whereby the operation of the relay 24 is directly responsive to the speed of the vehicle as determined by the speed of rotation of the output shaft of the transmission. When the conductor 27 is energized, current flows therethrough to the tell-tale light 30, which indicates that the ignition system of the booster engine is energized. Also, current from this conductor is transmitted through the conductor 84 to the gas check valve 85 located adjacent the booster engine. The gas check valve 85, therefore, upon flow of current through the conductor 27 opens to allow fuel to be forced from the fuel pump 86 located at the main engine through the conduit 87 and through the valve 85 into conduit 88 leading to the carburetor 89 of the booster engine. At the same time, current is conducted from the line 27 to the line 90 extending between the positive side of the high tension coil 92 of the booster engine and an oil switch indicated generally at 93. A further branch connection 94 is taken off of the conductor 27, and is connected to one terminal of a backfire control element 95, which is provided for safety purposes.

The opposite side of the backfiring control element 95 is connected through conductor 96 to one terminal 97 of the secondary coil of the Startix 42. The other terminal 98 of the secondary coil of Startix 42 is connected through conductor 99 to a terminal 100 on the oil switch control member 93. Still another terminal of the oil switch control member 93, indicated at 102, is connected through the conductor 103 to the tell-tale light 104. This tell-tale light is therefore responsive to the oil switch 93, the oil switch itself being actuated by the oil pressure in the crankcase of the booster engine, which oil pressure is directly responsive to actuation of the booster engine and cuts out the tell-tale light 104 when the oil pressure is such as would indicate that the booster engine has been started.

Operation of the oil switch 93 results in opening of the circuit between terminals 105 and 102, and closing of terminals 105 and 100. This energizes the secondary coil of the Startix 42 between terminals 97 and 98, thereby opening the primary circuit of the Startix 42, de-energizing the starting motor 40. Thus the tell-tale 104 which, together with the tell-tale 30, is mounted upon the instrument board of the vehicle, indicate the starting and ignition conditions at the booster engine. The tell-tale 30 is energized at all times that the booster ignition circuit is energized, and consequently indicates that the booster engine is in operation.

The tell-tale 104 is energized whenever the starting circuit for the booster engine is energized, and consequently indicates that the starting circuit is energized. Also, inasmuch as the tell-tale 104 is connected through the oil switch 93, it will remain energized if the oil pressure in the booster reaches a dangerously low point, and consequently will indicate also low oil in the booster engine since the tell-tale will remain energized after the starting circuit has started the booster if the oil level in the booster is too low. This provides a double check for the operator, since if the tell-tale 104 remains energized for any appreciable length of time, it indicates that there is either something wrong in the starting circuit or the oil pressure is too low to cut out the oil switch 93. The terminal 105 of the oil switch 93 is adapted to be directly connected to the terminal 100 when the oil switch is actuated thereby deenergizing the Startix 42, while current is fed to coil 92 through conductor 27. From the coil 92 a suitable conductor 106 leads to the distributor 107 of the booster engine.

In the operation of the control system as thus described, it will be apparent that the throttle of the booster engine can never be opened unless the accelerator switch 32 controlled by the foot accelerator at the main engine has been energized by moving the foot accelerator to a predetermined position indicating full open throttle position as the main engine. This in turn will control operation of the diaphragm throttle control 48, thus preventing the booster engine from coming up to speed even if it were energized, unless the accelerator switch 32 is actuated.

However, the accelerator switch 32 works in conjunction with the relay 24 so that if at any time the speed of the vehicle is greater than 6 miles per hour and the throttle position at the main engine under normal operation of the vehicle indicates a load condition, the relay will cut in to energize the conductor 27, which consequently will receive current through the conductor 22 leading from the booster switch to energize the solenoid valve 35. The load responsive means at the main engine comprising the vacuum switch 108, which may be of the type shown in Price Patent 2,343,265 issued March 7, 1944, is connected to the manifold of the main engine through the conduit 109, and when energized, closes the circuit through conductors 110 and 111 to control operation by the relay for establishing contact between the terminals 23 and 25 of the relay. Thus, with the load responsive switch 108 energized, the governor assumes control of the system and with speeds above six to seven miles per hour with the main engine under full load will energize the conductor 27, which in turn opens the gas check valve 85, lights the tell-tale 30, energizes the Startix 42, and transmits current to the positive side of the coil 92 and also to the terminal 105 of the oil switch. The accelerator switch being closed, current through the conductor 33 will energize the vacuum solenoid valve 35 to control the throttle actuating device 48 at the booster engine, and, the Startix being energized, will actuate the starting motor 40 through the Startix 42 to start the booster engine.

As the booster engine starts, the vacuum in the manifold 50 will, through the valve 35, open the throttle of the booster engine, bringing it up to speed and thereby increasing the oil pressure to a point where the normal connection between terminals 105 and 102 is broken, de-energizing tell-tale 104, and a connection is made between terminals 100 and 105, whereby current from conductor 27 is led through conductor 99 to the terminal 98 of the Startix and thereby energizes the secondary coil of the Startix and thus opens the connection through the Startix and de-energizes the circuit through the starting motor 40. The coil 92 being directly fed from the conductor 27 which is connected to the conductor 99 at 112, remains energized. The booster engine will then continue full speed operation until one of the following conditions occurs:

1. The accelerator switch 32 is opened due to lack of necessity for full engine speed, which in turn will de-energize the solenoid valve 35 and consequently close the throttle actuating member 48, idling the booster engine. This is provided for allowing gear shifts into various speed ratios.

2. The governor 80 reaches a speed above the predetermined maximum to which the booster engine is to be operated, which in turn will de-energize the connections between the terminals 23 and 25, thus de-energizing conductor 27 and consequently closing off the ignition circuit of the booster engine.

Thus it will be apparent that with this control system, whenever the speed and load conditions at the main engine indicate the need for additional torque, the booster engine will be automatically started and brought up to full speed, by the conjoint operation of governor 80, vacuum switch 108 and accelerator switch 32.

The circuit of relay 24 is energized to open the gas check valve 85 and the vacuum solenoid valve 35, thus admitting fuel to the carburetor of the booster engine and opening the throttle thereof, simultaneously energizing the ignition circuit, which in turn energizes tell-tale light 30 and simultaneously energizing the Startix 42 as indicated by the tell-tale 104. As the booster engine starts up, the oil pressure in switch 93 cuts out the Startix 42, extinguishing tell-tale 104 and connecting the full speed power of the booster directly into transmission 7. The booster will remain in operation from this time on until the accelerator switch 32 is de-energized, when it will idle, or until the governor responds to a speed above the predetermined maximum for de-energizing the relay 24 to cut out the ignition circuit of the booster. While vacuum switch 108 controls in starting of the booster, it is of the hold down type, and is locked out of control while the booster is running.

Another phase of the control is provided for insuring starting of the booster when the vehicle speed decreases from a point above the maximum speed to a predetermined intermediate point under full load and throttle conditions. In the particular embodiment of the invention, the contacts in the governor are adjusted so that when the vehicle speed drops to 30 or 35 miles per hour with the vacuum switch 108 energized and the accelerator switch 32 closed, the relay 24 will again be energized to start the booster and bring it up to speed. This control is embodied in the relation of the contacts actuated by the governor and the coils in the relay 24, and may be varied to suit individual requirements.

In one preferred form of the invention, I have provided for actuating the booster from a point above 6 miles per hour to 45 miles per hour whenever the load and throttle conditions at the main engine indicate that additional power is required, the booster being automatically cut out regardless of load and throttle conditions when the speed of the vehicle reaches 45 miles per hour. However, with the vehicle running at 45 miles per hour or above, the booster can never be operated regardless of load requirements. If, under full load and throttle conditions, the vehicle speed decreases from 45 miles per hour to 35 miles per hour, the governor operates to actuate the relay for again starting the booster engine and maintaining it in operation until the speed has again reached 45 miles per hour.

Considering now in detail the preferred form of oil pressure switch employed in the present system, indicated generally at 93, this particular construction is shown in detail in Figures 3, 4 and 5.

The switch comprises a housing 120 which is provided with a cup-shaped annular flange portion 122 having an internal sleeve portion 123 acting as a support for an insulating closure plate 124 carrying the contacts and terminals of the switch. The cap 124 is held in position by spinning over the end of the flange 122, as indicated at 125. The switch body 120 is provided with a centrally projecting threaded boss 126, which is adapted to receive the threaded bushing 127 apertured as indicated at 128 to receive pressure from an oil supply line connected between the boss 126 and the crankcase of the booster engine. An adjusting spring 131 is mounted between bushing 127 and the diaphragm.

Mounted between the sleeve 123 and the base of the switch member 120 is a diaphragm 129 which, adjacent its center portion, is adapted to support a metallic stem 130 surrounded by a metallic sleeve 132 and a helical spring member 133. Oil pressure communicated through the port 128 into the body member 120 acts to raise the diaphragm 129 from the position shown, thereby moving the stem 130 upwardly. The upper end of the stem 130 is provided with a contact tip portion 134 which, upon upward movement, is adapted to engage the contact portion 135 of a spring contact arm 136 carried by the terminal connection 105. The free end of the arm 136 is provided with a contact 137 normally in engagement with the contact 138 carried by the arm 139 of the terminal assembly 102. Thus, it will be apparent that when the stem 130 is raised, the contact tip portion 134 engages the contact 135 of the spring arm 136, separating contacts 137 and 138, and thus breaking the connection between terminals 102 and 105. During this rise of the plunger 130, it will be noted that the spring 133 remains biased against the downwardly offset bar member 140, which is mechanically and electrically joined at one end to the terminal 100 and at the opposite end to a rivet 142. Inasmuch as the spring embraces the sleeve 132 and also has mechanical contact with the disc 143 engaging the stem 130, electrical contact is at all times effected between the terminal 100 and the stem 130. As a result, when the upper contact tip 134 of the stem 130 engages the arm 136, contact is made between terminals 105 and 100 through contact arm 136, stem 130, bar 140 and terminal 100. Thus, this contact is made as the contacts between terminals 105 and 102 is broken through contacts 137 and 138. The upper end of the sleeve 132 limits upward movement of the stem 130 and insures positive electrical contact between the terminals 105 and 100.

When the pressure is reduced in the crankcase of the booster engine, the diaphragm 129 is urged downwardly into the position shown in Figure 5 by means of the spring 133, thereby successively opening contact between terminals 105 and 100 and establishing contact between terminals 105 and 102.

It will therefore be apparent that with such a construction, if the oil in the booster crankcase is sufficiently low that inadequate pressure is provided to raise the diaphragm 129, this condition will be indicated by the tell-tale light 104, remaining lit, and also, the starter circuit remaining actuated because of the fact that the secondary coil of the Startix is not energized to cut out the primary.

It is therefore believed apparent that I have provided a novel type of control system which is considerably simplified in both the number of parts and the method of assembling, and which eliminates the necessity of a generator at the booster engine or the provision of a vacuum control line for controlling the throttle at the booster engine from the main engine fuel pump. The details of the governor and relay are not believed necessary of detailed description since the relay has been previously described in the copending application, referred to above, and the governor is a more or less conventional type of structure employing centrifugally operated means for successfully controlling the actuation of various contacts, depending upon the speed of the vehicle as determined from the transmission shaft.

I am aware that various changes may be made in certain details of the present construction, and I therefore do not intend to be limited except as defined by the scope and spirit of the appended claims.

I claim:

1. In combination, in a vehicle, a main engine, a supplemental engine, means responsive to predetermined load at the main engine and speed of the vehicle for starting said supplemental engine, manifold pressure responsive means at the supplemental engine for automatically opening the throttle thereof, and oil pressure responsive means at the supplemental engine for de-energizing the starting circuit thereof.

2. The combination of claim 1 further characterized in the provision of means associated with said manifold pressure responsive means responsive to the accelerator position at said main engine for conditioning said manifold pressure responsive means for operation.

3. In combination, in a vehicle, a main engine having an accelerator and a fuel pump, a supplemental engine having a starting circuit, a throttle, and a fuel supply means, means responsive to predetermined load at the main engine and speed of the vehicle for energizing said starting circuit, and connecting said fuel pump to said supplemental engine, means responsive to accelerator position at said main engine for conditioning the throttle at said supplemental engine for operation, and manifold pressure responsive means at said supplemental engine for opening the throttle of said supplemental engine.

4. The combination of claim 3 further characterized in the provision of means responsive to oil pressure at said supplemental engine for deenergizing said starting circuit.

5. In combination, a main engine having an accelerator, a supplemental engine having a throttle, a starting circuit and an ignition circuit, means responsive to predetermined speed of vehicle and load conditions at said main engine for energizing both said circuits, means responsive to accelerator position for conditioning said throttle for operation, means at said supplemental engine responsive to starting thereof for independently deenergizing said starting circuit, and means responsive to starting of said supplemental engine for opening its throttle.

6. In combination, in a vehicle, a main engine having an accelerator, a supplemental engine having a starting circuit, an ignition circuit, and a manifold pressure-controlled throttle, means responsive to predetermined speed of said vehicle and throttle position at said main engine for energizing said ignition circuit, and means responsive to accelerator position for energizing said starting circuit and conditioning said throttle for operation.

7. The combination of claim 6 including means responsive to oil pressure at said supplemental engine for deenergizing said starting circuit independently of said accelerator position.

8. The combination, in a vehicle having a main engine, a supplemental engine, and means responsive to speed of the vehicle and predetermined throttle position at the main engine for starting said supplemental engine, of a throttle control means at said supplemental engine comprising a manifold, a solenoid valve, a diaphragm, and a throttle valve controlled by said diaphragm, said valve being energized by said starting means for establishing a connection between said manifold and diaphragm whereby manifold vacuum actuates said diaphragm.

9. The combination of claim 8 further characterized by means in said valve for admitting atmospheric air to said diaphragm upon deenergization of said valve.

10. In combination, in a vehicle comprising a main engine having an accelerator, an auxiliary engine, and interlocking means responsive to speed of the vehicle and load conditions at the main engine for starting said auxiliary engine, a carburetor for said auxiliary engine having a fuel supply, a throttle and a pressure responsive throttle actuating means, a manifold vacuum connection at said auxiliary engine connected to said actuating means, a valve in said connection, and means including an accelerator switch responsive to a predetermined position of said accelerator providing a full open throttle position at said main engine for opening said valve to energize said actuating means for controlling said throttle at said auxiliary engine.

11. The combination, with a vehicle having a main engine having an accelerator, an auxiliary engine, and means responsive to speed of the vehicle and the throttle position at said main engine to start said auxiliary engine, of throttle control means for said auxiliary engine including a manifold vacuum line, a valve therein, and a diaphragm actuator, and means including an accelerator switch responsive to a predetermined accelerator position providing a full open throttle position at said main engine for energizing said valve to control the throttle at the auxiliary engine.

12. The combination of claim 11 wherein said throttle control means includes means for holding the throttle at said auxiliary engine in full open position whenever the accelerator at the main engine exceeds a predetermined open position.

13. The combination of claim 11 wherein said throttle control means includes over-center lever means and a spring so constructed and arranged as to open the throttle at said auxiliary engine to full open position whenever the accelerator switch is energized indicating that the throttle at said main engine is beyond a predetermined position, and to close said auxiliary engine throttle to idling position whenever the accelerator switch is de-energized, indicating that said main engine throttle is opened less than said predetermined position.

14. The combination, with a vehicle having a main engine and an accelerator, and an auxiliary engine having a starting circuit adapted to be energized upon predetermined speed of said vehicle and throttle position at said main engine, of throttle control means responsive to manifold vacuum at said auxiliary engine and responsive to a predetermined depressed accelerator position at said main engine for bringing said auxiliary engine up to full speed, said means including means for idling said auxiliary engine whenever said throttle at the main engine is below said predetermined open position, and means responsive to starting of said auxiliary engine for independently deenergizing said starting circuit.

15. In combination, a main engine having an accelerator, a supplemental engine having a throttle, a starting circuit and an ignition circuit, means responsive to predetermined speed and load conditions at the main engine for energizing both said circuits, means responsive to accelerator position for conditioning said throttle for operation, means at said supplemental engine responsive to starting thereof for independently deenergizing said starting circuit, and means responsive to starting of said supplemental engine for opening its throttle, said starting circuit including a tell-tale energized therewith, and said de-energizing means comprising a switch responsive to oil pressure at said supplemental engine which simultaneously de-energizes said tell-tale upon de-energization of said starting circuit.

16. The combination in a vehicle having a main engine, a supplemental engine and means responsive to speed of the vehicle and predetermined throttle position at the main engine for starting said supplemental engine, of a throttle control means at said supplemental engine comprising a manifold, a solenoid valve, a diaphragm, and a throttle valve controlled by said diaphragm, said solenoid valve being energized by said starting means for establishing a connection between said manifold and diaphragm, whereby manifold vacuum actuates said diaphragm and means responsive to predetermined actuation of said diaphragm for moving the same into full open throttle position regardless of variations in pressure in said manifold.

DONALD D. ORMSBY.

REFERENCES CITED

The following references are of record in the file of this patent:

UNITED STATES PATENTS

| Number | Name | Date |
|---|---|---|
| 1,908,088 | Warner | May 9, 1933 |
| 2,343,265 | Price | Mar. 7, 1944 |